July 7, 1953   A. P. BALZER   2,644,540
DRIVE TRANSMISSION FOR STEERABLE TRACTOR WHEELS
Filed July 12, 1950   3 Sheets-Sheet 1

Inventor
Abram P. Balzer
By his Attorneys
Merchant & Merchant

Inventor
Abram P. Balzer
By his Attorneys
Merchant & Merchant

Inventor
Abram P. Balzer
By his Attorneys
Merchant & Merchant

Patented July 7, 1953

2,644,540

UNITED STATES PATENT OFFICE 2,644,540

DRIVE TRANSMISSION FOR STEERABLE TRACTOR WHEELS

Abram P. Balzer, Mountain Lake, Minn.

Application July 12, 1950, Serial No. 173,371

1 Claim. (Cl. 180—26)

My invention relates generally to tractor construction and more specifically to a steerable drive wheel unit applied to a tractor for farm use.

In tractors of the type employing a single steerable drive wheel, the drive wheel is usually journalled in a forklike member mounted in the tractor frame for steering rotation about a vertical axis, and the wheel is rotated by means of bevel gears or the like, one of which is mounted on a shaft extending through the journalled portion of the mounting fork coaxially therewith. It has been found that this type of drive exerts a force on the wheel mounting fork tending to impart steering rotation thereto and interfering with intentional steering thereof. An important object of my invention therefore, is the provision of a tractor having a single dirigible drive wheel and driving mechanism therefor which will permit free steering movements of the drive wheel.

Another object of my invention is the provision of driving mechanism which will impart full driving power to the drive wheel without exerting any steering action to the mounting fork thereof when steering movements are being imparted to the fork by the operator.

Still another object of my invention is the provision of a tractor of the above type which may be quickly and easily coupled to a wheel-equipped farm implement and be partially supported thereby, and when uncoupled therefrom to be self sustaining.

Another object of my invention is the provision of a tractor as set forth which, when coupled to a farm implement, will enable the implement to be turned about a minimum radius.

Another object of my invention is the provision of means whereby the operator of the tractor may be seated facing either the front or the rear of the tractor and control the same with equal facility from either position.

A still further object of my invention is the provision of a tractor as set forth which, when coupled to an implement has the greater portion of its weight carried by the drive wheel.

Another object of my invention is the provision of a tractor of the above type which is relatively inexpensive to produce, which is efficient in operation, and which is rugged in construction and durable in use.

Other highly important objects and advantages of my invention will become apparent from the following detailed specification, appended claim, and attached drawings.

Referring to the drawings, wherein like characters indicate like parts throughout the several views.

Figure 1:
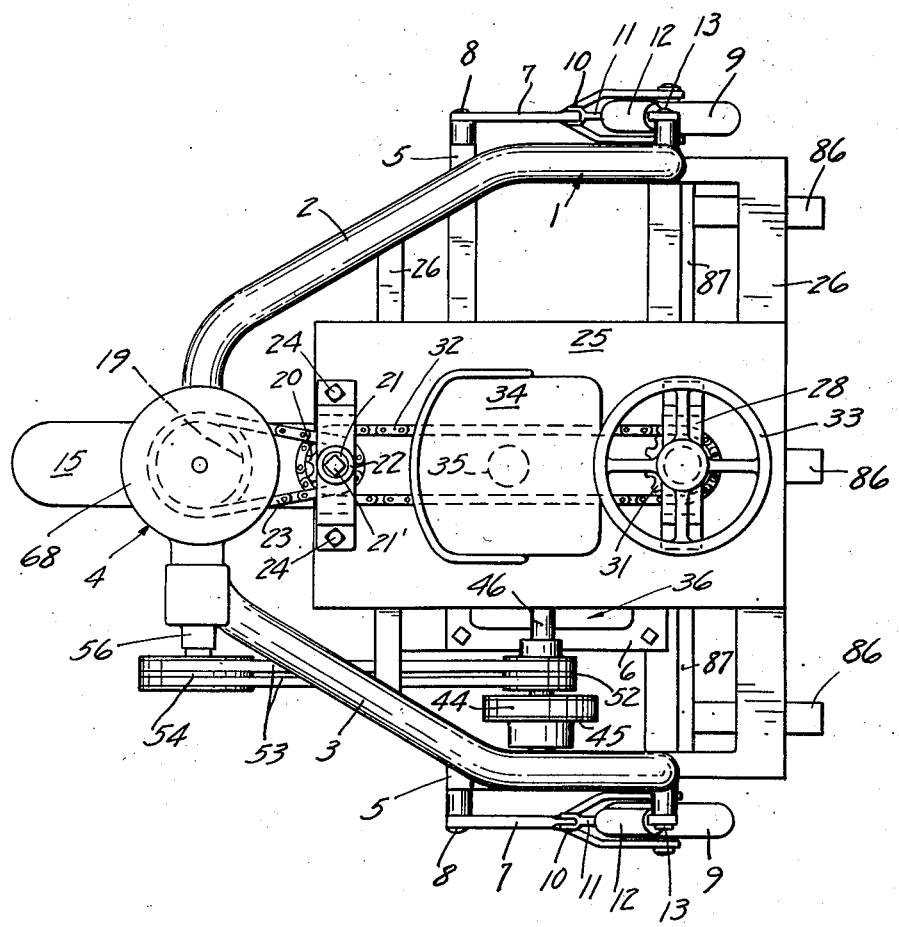
Fig. 1 is a view in plan of my novel tractor.

Referring with greater detail to the drawings, the numeral 1 indicates in its entirety a frame comprising a pair of forwardly and downwardly extending frame members 2 and 3 which converge rearwardly at their upper end portions toward a central driving head 4. The frame further includes a pair of depending legs 5 which support a motor mounting base 6, and to the lower end portions of which are pivotally mounted at one of their ends a pair of arms 7, as indicated at 8. A pair of pneumatic tire-equipped supporting wheels 9 are journalled to the opposite bifurcated ends of the arms 7, the intermediate portions of which are pivotally secured, as indicated at 10, to the outer ends of a pair of piston-equipped plungers 11 that are mounted for extending and retracting movements in fluid pressure operated cylinders 12. The cylinders 12 are pivotally secured at one of their ends to the lower portion of the frame members 2 and 3 respectively, as at 13, and are adapted to have fluid under pressure supplied thereto from suitable pump means not shown, through fluid pressure conduits 14. Fluid under pressure introduced into the cylinders 12 will cause the arms 7 and the wheels 9 carried thereby to be moved downwardly with respect to the frame 1 whereby to raise the adjacent end of the frame. On the other hand, when fluid is permitted to return to the source from cylinders 12, the piston plungers 11 will be retracted and the wheels 9 moved upwardly with respect to the frame 1.

Figure 2:
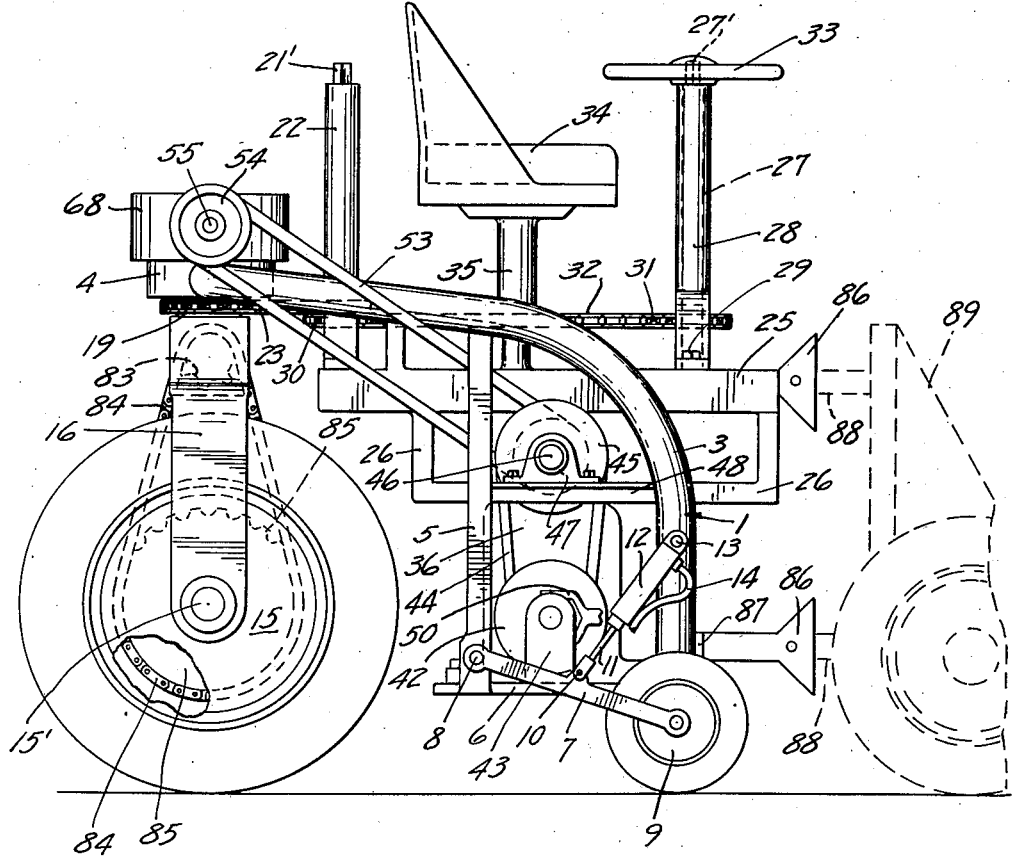
Fig. 2 is a side elevation, some parts being broken away.

The rear end portion of the frame 1 is supported by a pneumatic tire-equipped dirigible driving wheel 15, the axle shaft 15' of which is journalled in the lower end of a bifurcated mounting member or fork 16. The fork 16 is generally vertically disposed and has its upper portion 17 mounted in spaced anti-friction bearings 18 in the head 4 for steering movements about a vertical axis. Steering movements are imparted to the fork 16 and the wheel 15 journalled therein by mechanism including a sprocket wheel 19 keyed or otherwise rigidly secured to the upper end portion 17 below the head 4, a second sprocket 20 fast on the lower end portion of a steering shaft 21 which is journalled in a vertically disposed steering post 22, and an endless link chain 23 running over the sprockets 19 and 20. The post 22 is rigidly secured by bolts or the like 24 to the rear end portion of an operator's platform 25 mounted on a framework 26 extending laterally between the frame members 2 and 3 and welded or otherwise rigidly secured thereto. A second steering shaft 27 is journalled for rotation in a tubular steering post 28 similar in all respects to the post 22 and secured to the platform 25 by bolts 29. A sprocket wheel 30 is mounted fast on the steering shaft 21 below the sprocket 20 and a similar sprocket 31 is mounted fast on the lower end portion of the shaft 27, these sprockets 30 and 31 being connected by an endless link chain 32, whereby rotation of one of the shafts 21 or 27 will impart rotation to the other thereof and to the steering fork 16 through the connections including the endless link chain 23. With reference to Figs. 1 and 2 it will be seen that the upper ends 21′ and 27′ of the shafts 21 and 27 respectively are cross sectionally rectangular whereby to receive selectively thereon a steering wheel 33. The steering wheel 33 is provided with a cross sectionally rectangular recess as indicated by dotted lines in Fig. 2 to fit the upper ends 21′ and 27′ whereby the shafts 21 and 27 may be rotated. An operator's seat 34 is mounted on a pedestal-like base 35 for rotation about a vertical axis. The seat 34 may be rotated from a position facing the steering post 22 to its position of Fig. 2 wherein it faces the steering post 28, so that, irrespective of the direction in which the tractor is driven, the operator may face forwardly without undue twisting or turning of his body.

Figure 3:
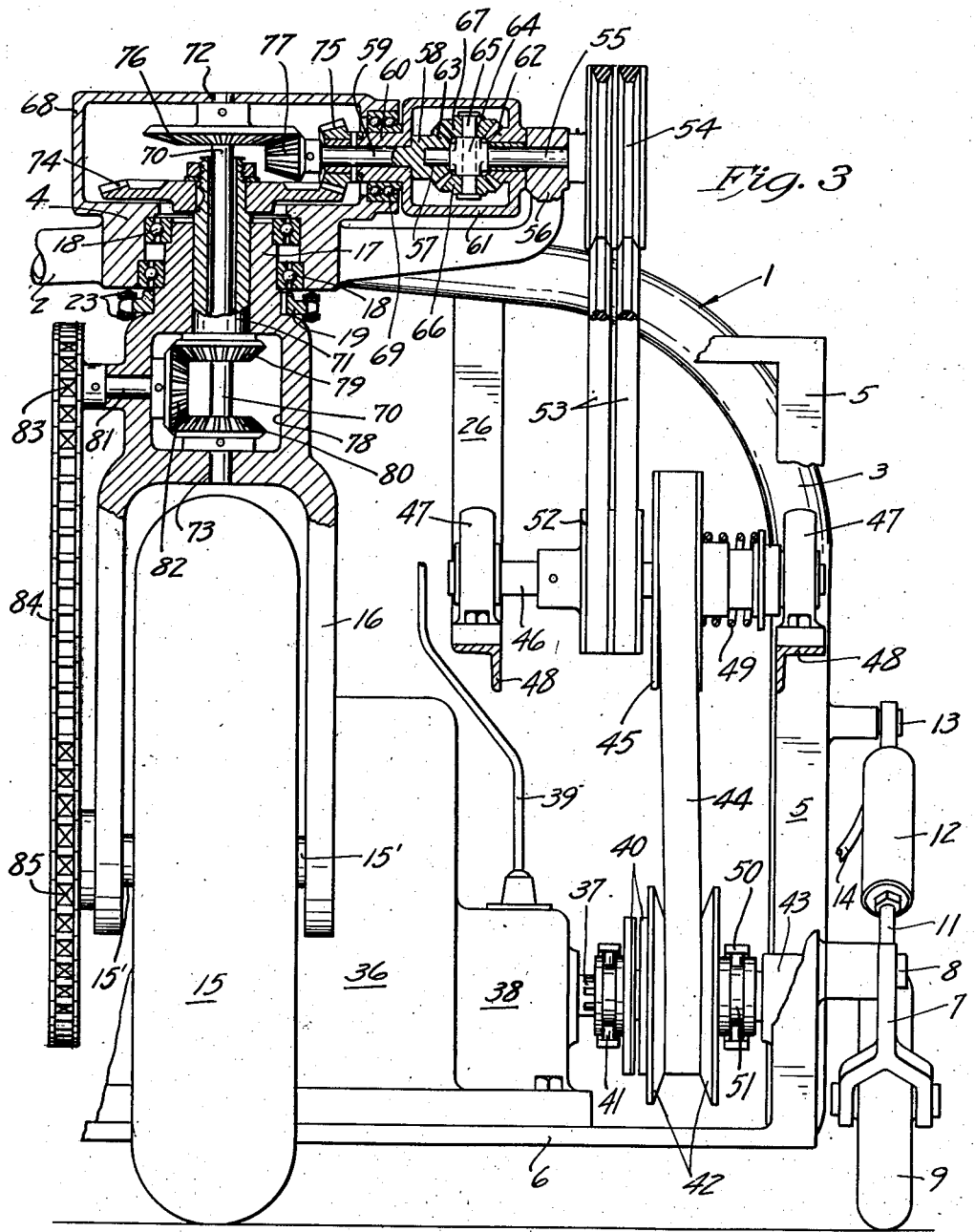
Fig. 3 is an enlarged fragmentary view in end elevation, some parts being broken away and some parts shown in section.

My improved tractor is driven from a conventional internal combustion engine 36 having a drive shaft 37 projecting from one end thereof. As shown in Fig. 3, the shaft 37 projects outwardly from a gear housing 38 and is adapted to be rotated in either direction by conventional gearing not shown but contained within a housing 38 and controlled by a gear shift lever 39. A friction clutch 40 operated by suitable means including a shifter fork 41 is utilized to couple the shaft 37 to a variable speed pulley 42 carried by the shaft 37 and an outboard bearing 43. An endless V-belt 44 runs over the pulley 42 and over a similar pulley 45 mounted on a jackshaft 46 that is journalled at its opposite ends in bearings 47 mounted on cross bars 48 of the frame 1. The opposite belt-engaging sides of the pulley 45 are urged toward one another by a coil compression spring 49 whereas the opposite side portions of the pulley 42 are moved toward and away from each other by a conventional shifter fork 50 engageable with a groove 51 in a hub portion on one of the side elements of the pulley 42. Lateral shifting of the shifter fork 50 causes the belt 44 to drive the jackshaft 47 at varying speeds according to the desires of the operator. A pulley 52 is pinned or otherwise rigidly secured to the jackshaft 46 and has running thereover a pair of V-belts 53 which extend upwardly and rearwardly and run over a second pulley 54 mounted fast on a power transmission input shaft 55, as shown in Figs. 1 and 3. The input shaft 55 is journalled in a bearing bracket 56 extending laterally outwardly from the head 4. At its inner end, the input shaft 55 is journalled in a recess 57 opening axially outwardly from the enlarged end 58 of an inner drive shaft 59. The shaft 59 is journalled for rotation in a sleeve-like hub 60 projecting laterally outwardly from a housing 61, the opposite end portion of which is journalled on the input shaft 55 adjacent the outer end of the bearing bracket 56.

The housing 61 is integrally formed with a bevel gear 62 coaxial with the input shaft 55 and which is in opposed relationship to a similar bevel gear 63 integrally formed with the enlarged end 58 of the inner drive shaft 59. The input shaft 55 intermediate the gears 62 and 63 is formed to provide an enlarged head 64. A shaft 65 extends through the head 64 and diametrically through the input shaft 55 and has journalled on the opposite end portions thereof a pair of bevel gears 66 and 67 which have intermeshing engagement with the opposed gears 62 and 63. This arrangement provides a differential drive for the inner drive shaft 59 and the sleeve-like outer drive shaft 60. It will be noted by reference to Fig. 3 that the sleeve 60 is mounted for rotation in one end of a casing or the like 68 formed as a portion of the head 4. An antifriction bearing 69 is interposed between the end of the casing 68 and sleeve 60.

A pair of concentric shafts 70 and 71 extend vertically through the upper end portion 17 of the drive wheel mounting fork 16 and coaxially therewith. As shown, the shaft 71 is in the nature of a tubular sleeve through which the shaft 70 extends and is journalled in the upper portion 17 of the mounting member 16. The shaft 70 extends loosely through the tubular shaft 71 and is journalled at its opposite ends in the casing 68 and in the mounting member 16 as indicated at 72 and 73 respectively. A bevel gear 74 is keyed or otherwise rigidly secured to the upper end of the tubular shaft 71 and has meshing engagement with a bevel pinion 75 mounted fast on the end portion of the sleeve 60. A bevel gear 76 is pinned or otherwise rigidly secured to the upper end portion of the shaft 70 in opposed relationship to the gear 74 and has meshing engagement with a bevel pinion 77 mounted fast on the inner drive shaft 59. It will be noted that the relative diameters of the bevel gears 74 and 76 and the bevel pinions 75 and 77 normally cause the concentric shafts 70 and 71 to be rotated at identical speeds, and that the opposed relationship between the bevel gears 74 and 76 causes the concentric shafts 70 and 71 to be rotated in opposite directions. The steering fork 16 is formed to provide a chamber 78 into which the outer concentric shaft 71 projects and through which the inner shaft 70 extends. The lower end of the shaft 71 is formed to provide a bevel gear 80 which is in opposed relationship to a like bevel gear 81 rigidly secured to the lower end portion of the shaft 70. A countershaft 81 is journalled in one side wall of the chamber 78 in parallel relationship to the axis of rotation of the drive wheel 15, and has rigidly secured to its inner end a bevel gear 22, diametrically opposed portions of which have simultaneous meshing engagement with the gears 79 and 80. A sprocket wheel 83 is rigidly secured to the outer end of the countershaft 81 and has running thereover an endless link chain 84. Said link chain 84 also runs over a relatively large sprocket wheel 85 mounted fast on the outer end of the steering wheel shaft 15′ whereby to impart rotation to the wheel 15.

From the above, it should be obvious that torque thrust exerted on the bevel gear 82 by the opposed bevel gears 79 and 80 occurs in opposite directions so that there is no tendency for the fork 16 to rotate about the axis of the head 17 thereof when a relatively heavy turning load is placed on the wheel 15. When the tractor is being driven around a corner or the like, the steering fork 16 and wheel 15 carried thereby are rotated about the axis of the head 17 in the same direction as one of the bevel gears 74 and 76. When this occurs, one of the pinions 75 and 77 tends to rotate at a greater speed than the other thereof. The speeds of the pinions 75 and 77 are equalized by the differential gears in the housing 61. By this means, the speeds of rotation of the concentric shafts 70 and 71 remain constant with respect to one another.

As above indicated, my improved tractor is particularly adapted to be used in connection with wheel-equipped farm implements such as cultivators, swathers, and the like. Diagrammatically shown in Figs. 1 and 2 are a plurality, preferably 3, of automatic couplers 86 one of which is rigidly secured to the platform 25 and the others of which are mounted on a cross bar 87 secured to the lower end portions of the frame members 2 and 3. The couplers 86 may be of any of the types in common usage, but are preferably of the type disclosed in my prior Patent No. 2,478,736. As indicated in Fig. 2, the couplers 86 are adapted to receive cooperating tongues 88, indicated by broken lines in Fig. 2, said tongues being suitably secured to the implement, the implement being indicated in its entirety by 89.

When it is desired to utilize my novel tractor to drive a farm implement, the supporting wheels 9 are raised or lowered as desired to bring the automatic couplers 86 into alignment with the tongues 88. The tractor is then moved in the direction of the tongues 88 until they become locked in the coupler 86, whereupon the wheels 9 are raised out of supporting engagement with the ground. Raising of the wheels 9 from contact with the ground causes the greater portion of the weight of the tractor to be supported by the dirigible drive wheel 15, whereby sufficient traction is provided to permit the tractor to effectively propel the implement 89. In the event that the implement 89 is of the type which normally operates behind a tractor, the operator merely places the steering wheel 33 on the end 21' of the steering shaft 21 and revolves the operator's seat 180 degrees from its position shown in Figs. 1 and 2 so that he is facing forwardly in the desired direction of travel.

From the above, it should be obvious that I have provided a tractor which is fully capable of accomplishing the objectives set forth; and while I have disclosed a commercial embodiment of my improved tractor, it will be understood that the same is capable of modification without departure from the spirit and scope of the invention as defined in the claim.

What I claim is:

A vehicle having a single combined traction and steering wheel and comprising a frame, a generally vertically disposed steering fork mounting said wheel for driving rotation about a horizontal axis, said fork being journalled in the frame for rotary steering movements about a vertical axis, steering mechanism for rotating said fork about its axis, a single driving engine mounted on said frame, and power transmission mechanism associated with the engine for imparting rotation to the traction wheel, said transmission mechanism comprising an input shaft journalled in the frame and driven by said engine, a bevel gear mounted on said input shaft and rotatable about an axis at right angles to the axis of rotation of said input shaft, a pair of opposed bevel gears coaxial with said input shaft and having meshing engagement with said first-mentioned bevel gear, said pair of bevel gears terminating in drive shafts each having a drive gear on its outer end, a pair of concentric shafts rotatably mounted in the upper end of said fork and coaxial therewith, a pair of opposed gears one each on the upper end of each of said concentric shafts and each operatively associated with one of said drive gears, whereby the concentric shafts are rotated in opposite directions at like speeds, a pair of axially spaced opposed equalizer gears on the lower ends of the concentric shafts, a countershaft journalled for rotation in said fork about an axis in spaced parallel relationship to the axis of said traction wheel, a gear fast on the countershaft and having diametrically opposed portions in meshing engagement simultaneously with said opposed equalizer gears, and driving connections between the countershaft and the traction wheel at one side only of said fork, said driving connections including a pair of sprocket wheels one each secured to the countershaft and traction wheel and a link chain running over said sprocket wheels in driving engagement therewith.

ABRAM P. BALZER.

References Cited in the file of this patent

UNITED STATES PATENTS

| Number | Name | Date |
|---|---|---|
| 644,610 | Knight | Mar. 6, 1900 |
| 1,191,333 | Montgomery et al. | July 18, 1916 |
| 1,282,033 | Blewett | Oct. 22, 1918 |
| 1,353,192 | Tinker | Sept. 21, 1920 |
| 2,333,611 | Wolf | Nov. 2, 1943 |
| 2,421,867 | Bizjak | June 10, 1947 |

FOREIGN PATENTS

| Number | Country | Date |
|---|---|---|
| 180,579 | Germany | Jan. 21, 1907 |